Feb. 14, 1950     I. PEYCHES     2,497,369
METHOD AND APPARATUS FOR THE PRODUCTION
OF FIBERS, IN PARTICULAR GLASS FIBERS

Filed Sept. 21, 1945     2 Sheets-Sheet 1

Inventor
Ivan Peyches
By
Attorney

Feb. 14, 1950  I. PEYCHES  2,497,369
METHOD AND APPARATUS FOR THE PRODUCTION
OF FIBERS, IN PARTICULAR GLASS FIBERS
Filed Sept. 21, 1945  2 Sheets-Sheet 2
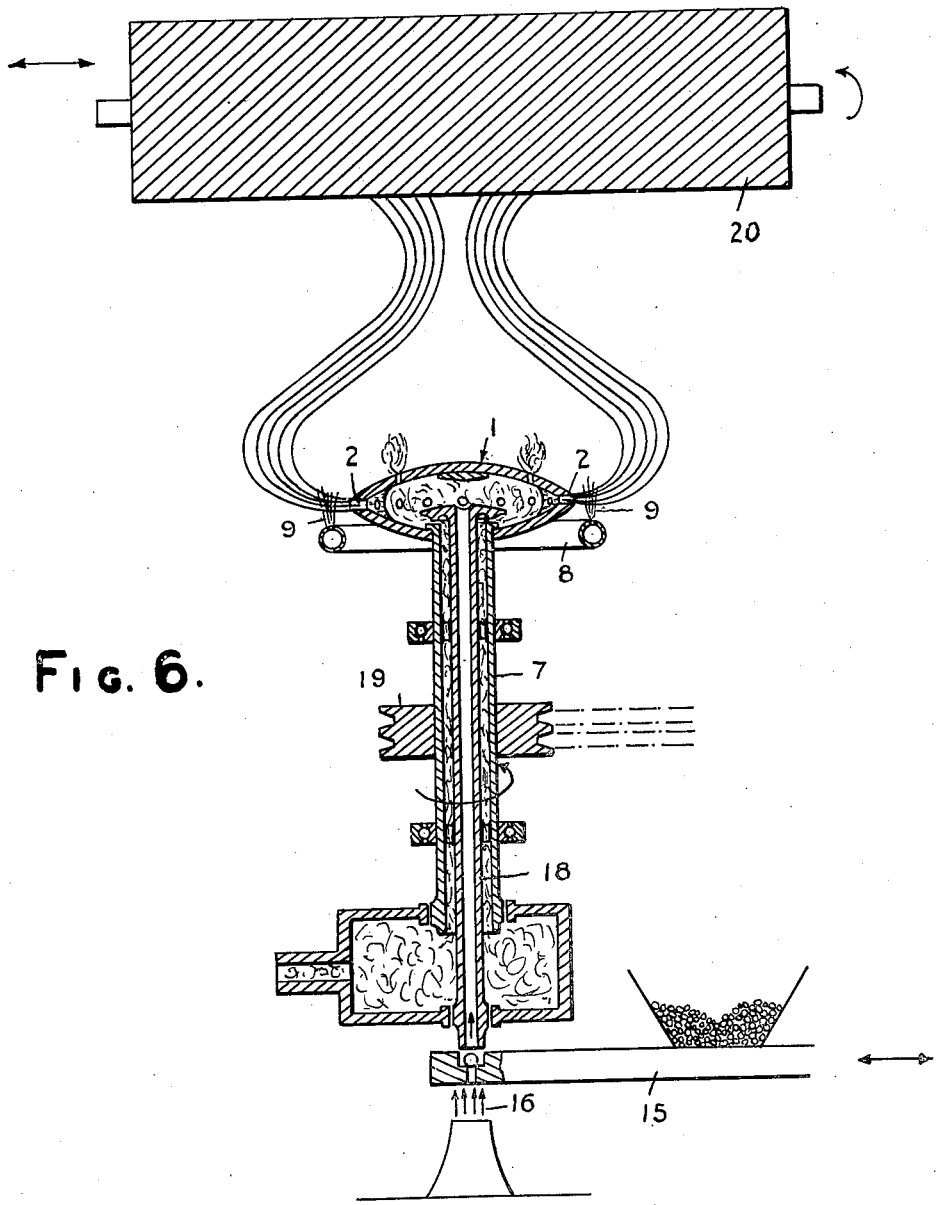
Fig. 6.
INVENTOR.
IVAN PEYCHES
BY 
ATTORNEY Patented Feb. 14, 1950

2,497,369

UNITED STATES PATENT OFFICE 2,497,369

METHOD AND APPARATUS FOR THE PRODUCTION OF FIBERS, IN PARTICULAR GLASS FIBERS

Ivan Peyches, Paris, France, assignor to Societe Anonyme des Manufacturers des Glaces et Produits Chimiques de Saint-Gobain, Chauny & Cirey, Paris, France Application September 21, 1945, Serial No. 617,935 In France August 19, 1943

Section 1, Public Law 690, August 8, 1946 Patent expires August 19, 1963

9 Claims. (Cl. 49—77.5)

My invention has for its object the production of fibres from materials in the viscous state; such materials may be of a thermoplastic nature and either mineral or organic. The aim of the invention is namely to obtain very fine fibres.

My invention relates to the manufacturing process using a hollow rotating body provided with openings at its periphery and fed with the viscous material to be transformed into fibres. Owing to the centrifugal force produced by the rotation of the hollow body, the viscous material is extruded out of the openings in the form of streams, which due to the relative movement of the rotating body in respect to the ambient medium in which they are moving, are drawn into fibres.

The fineness of the fibres obtained with such a process is firstly a function of the diameter of the stream issuing from the opening of the rotating body and secondly depends from the drawing undergone by said stream after it has issued from the orifice.

In view of producing very fine fibres, the process according to my invention consists in:

Giving to the material, such as glass, before it issues from the rotating body, a low temperature which, while enabling the glass to be extruded from the openings of the rotating body under the action of the centrifugal force, is not sufficiently high to enable the glass to be drawn into fibres as soon as it issues from the openings;

Raising the temperature of the glass stream after it has issued from the opening, in order to bring the glass to a temperature sufficient for its drawing;

Limiting such a re-heating to a short path of the stream and afterwards letting said stream cool in the ambient medium.

I ascertained, in the course of my experiments about this subject-matter, that the attenuation of the stream issuing from the rotating body is comparatively small when such stream has a relatively large diameter and is at a high temperature. In such a case, the glass is practically not hindered from issuing from the orifice, and it is projected out of the rotating body at a speed equal to or a little lower than the speed corresponding to the action of the centrifugal force when the latter is acting freely. Moreover, the glass thereafter keeps a comparatively high temperature during a rather long path. As a result, the successive elements of the glass stream flowing from the opening of the rotating body move along a trajectory path which, for each element, is the tangent to the circle described by the opening, at the point where the considered element left the opening.

In the accompanying drawings, in which corresponding parts are designated by corresponding marks of reference—

Figure 6 illustrates a form of my invention in which the centrifuge is fed from below.

Figure 1:
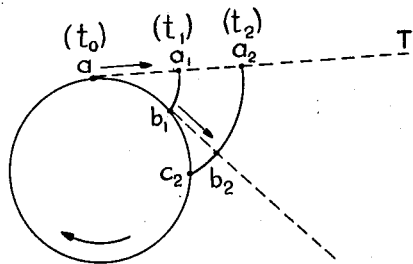
Figures 1, 2 and 3 are diagrams illustrating the principles on which this invention is based.

Fig. 1 of the accompanying drawings shows that, in this case, the issuing speed of an element $a$ is such that, after having issued, such element moves along the tangent T of its starting point. Such trajectory of the glass stream elements to which belongs $a$ (represented in $a_1$, $b_1$ at the time $t_1$ and in $a_2$, $b_2$ at the time $t_2$) may be obtained only if each element is submitted to the action of the single centrifugal force. Such condition is fulfilled when, as in the considered case, the glass stream is constituted by sufficiently fluid glass. Thus the elements of the glass stream (for instance $a_2$, $b_2$) are practically not driven along by the revolution of the rotating body and consequently they exert no important traction at the opening. In that case the drawing action corresponds only to the elongation of the glass stream in the course of its displacement ($a_1b_1$ having for instance become $a_2b_2$) and not to a traction action exerted by the whole of the stream on the glass issuing from the opening.

On the contrary, when decreasing the diameter of the opening and feeding glass less hot from the rotating body, experience shows that the glass stream exerts on the glass which is at the opening, a more and more important traction effort. As a fact, under those conditions the issuance of the glass is slackened as the opening is smaller or the glass less plastic. Moreover the glass stream being, from its origin, rather cold and having a smaller diameter, cools more rapidly than in the proceding case. As a result, the stream issues from the orifice at a lower speed than when the centrifugal force is acting without any constraint.

Figure 2:
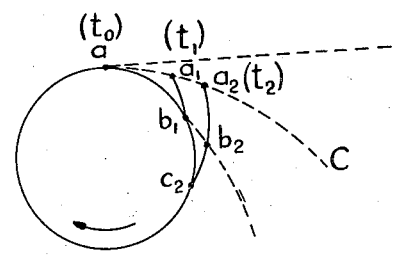

Referring to Fig. 2 concerning the case where the glass flow through the orifice is slackened, it will be seen that the glass stream has necessarily a smaller length than in the case represented on Fig. 1 where such flow is not hindered.

The trajectory of a glass element $a$, instead of being the tangent T at the issuing point, is a curve C comprised between the periphery of the revolving body and the tangent T. In other words, the elements of the stream, after having issued from the orifice, are not entirely free from the influence of the revolving movement of the rotating body and the stream consequently is submitted to a driving effect. As the ambient air has a tendency to hinder the stream elements from participating in the revolving movement of the rotating body, each element of the stream exerts a traction effort on the portion of said stream issuing from the opening. Such traction force is particularly important as the friction effect exerted by the ambient air on each element is transmitted up to said opening, because the glass stream connecting said element with the opening is composed of a comparatively cool, i. e. stiff glass.

However I ascertained that when and as the diameter of the opening and the glass temperature are only decreased in order to increase such traction effort, the improvement of the fibre fineness which was expected from the increase of such traction effort is not at all obtained. This may be explained by the fact that if such conditions increase the traction effort, they tend on the other hand to decrease the glass ability to be drawn, i. e. made thinner. In other words, when the glass is at a temperature suitable to obtain a good traction effort, such temperature is too low for the glass to be conveniently drawn.

The mere control of the glass temperature in the rotating body or the decrease of the openings through which the glass is extruded can consequently only give very limited results as to the obtention of fine fibres.

On the contrary the obtention, according to my invention of a glass stream at different temperatures enables to reach remarkable results in the production of fine fibres.

According to my process the produced glass stream presents, from the opening of the rotating body, a first portion which is at a comparatively low temperature and consequently little fit to be drawn, then an intermediary portion which is at a higher temperature and consequently under conditions where the glass is fit for being efficaciously drawn; such intermediary portion is followed by another portion of the glass stream which is at a lower temperature.

Figure 3:
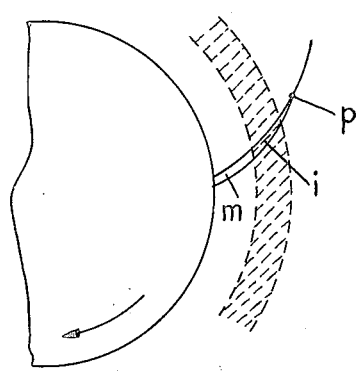

Figure 3 where, for the sake of clearness of the drawing, the diameter of the stream has been greatly increased, shows in $m$, $i$, and $p$ the three zones of the stream corresponding to said different temperatures; $m$ is the portion of the glass, at a rather low temperature, issuing from the revolving body, $i$ is the next intermediary portion at a higher temperature and $p$ is the next portion of the stream after $i$. Such portion $p$ being constituted by cold glass, is consequently in the hereabove described favorable conditions, where a glass stream is fit to exert an important traction effort on its origin. The intermediary portion $i$, which is at a high-temperature, is consequently in a state where it may be efficaciously drawn. Finally, the portion $m$ is able to exert a holding back effort on the portion $i$ and to contribute to the drawing of said portion.

The resulting conditions are such that the stream is drawn in a satisfactory way and that the drawing takes place almost entirely in the intermediary zone $i$.

In conformity with my invention the intermediary portion of the stream which is at higher temperature is given a small length so that, first of all, the portion $p$, at low temperature, will be as long as possible and consequently able to exert the greatest traction effort, and secondly the portion $i$ submitted to the traction will have the smallest possible volume so that, under a considered traction effort, it will be subjected to the most important attenuation. In other words, the localization of the intermediary hot zone $i$ enables to obtain the best attenuation of said portion.

As to portion $m$ of the stream, i. e. the portion connecting the intermediary hot portion $i$ with the outlet opening, the glass of said portion may be at a very low temperature, as the issuance of the glass results from the effect of the centrifugal force. In practice the invention may be carried out with glass at about 700° C. in the rotating body and consequently issuing from the opening at a temperature near said value. In the next portion, i. e. in the intermediary hot portion $i$, the glass stream may be brought to 900° C. The low temperature of the glass issuing from the opening is made possible, as hereabove stated, by the help brought by the centrifugal force in the extrusion of the glass. Owing to this low temperature of the glass issuing from the opening, the reheated zone $i$ may be brought to a temperature which, while being higher than that of the preceding zone, will nevertheless not be above the temperature at which the glass is in good conditions for being drawn. Such circumstances which are favorable for the drawing, would not be met if the glass in the rotating body and at its extrusion point were not at said very low temperature, of about 700° C. As a fact if the glass in the portion $m$ just after issuing from the opening were at a higher temperature, the supplement of heat brought to zone $i$ according to the invention, might bring said zone to a too high temperature and the traction effort exerted by the portion $p$ might produce not the drawing of the zone $i$ but a shearing of the glass of said zone.

Other characteristic features of the invention, as well as its advantages, will appear from the hereunder description given as a mere example of a way of carrying out the invention.

Figure 4:
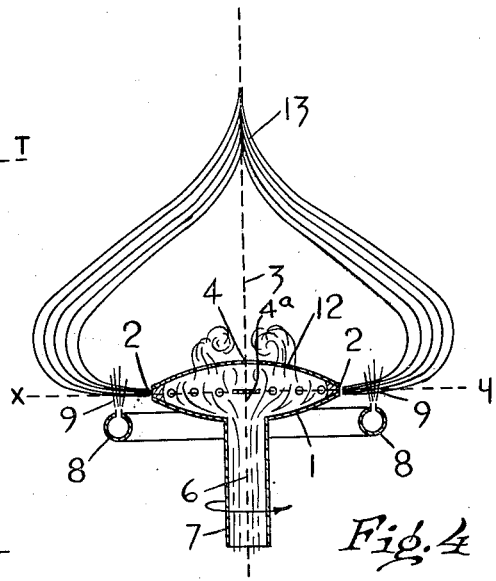
Figure 4 is a vertical section of an apparatus embodying this invention.
Figure 5:
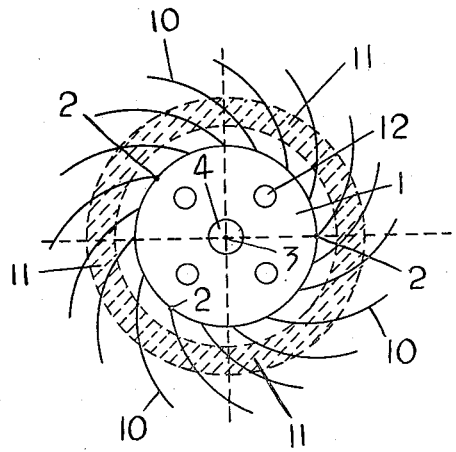
Figure 5 is a horizontal section on lines X—Y of Figure 4.

In Figures 4 and 5, I is the rotating body in the shape of two calottes united at their periphery forming, when rotating, a centrifuge. Extrusion openings 2 are provided in said periphery. 3 is the axis around which the centrifuge rotates. The glass is fed in the shape of balls, to the rotating body through the upper aperture 4 and falling on the shelf 4a is thrown by centrifugal force to the periphery of the centrifuge. Hot gases 6 are supplied through the inside of the driving shaft 7 of the centrifuging body. An annular burner 8 is placed outside the centrifuging body and co-axially with same, the flames 9 of said burner transversally crossing the horizontal plane $x$—$y$ of the trajectories followed by the glass issuing from the centrifuging body thus creating a hot annular zone therearound.

As the production is started with cold glass introduced into the hollow body to be heated, the glass in the centrifuging body may easily be prevented from being brought to a temperature higher than that at which it can begin, under the action of the centrifugal force, to be extruded through the openings. Thus the first of the characteristic features of my invention is obtained i. e. the temperature of the glass issuing from the openings is as low as possible.

Also, owing to the transversal position of the hot gases 9 in respect to the trajectories 10 followed by the glass streams, the extent of the heated zone in said glass streams is limited. Thus the localization of the reheating after the issuance of the stream is effected as provided according to the above described characteristics of my invention.

Beyond said hot zone 11, the glass gets cold, while being subjected to a friction from the ambient air. Such friction results in a traction effort exerted by the stream portion 10 on the part connecting it with the opening, i. e. namely on the intermediary portion while in the annular hot zone 11. As the glass stream in its totality passes through said annular zone 11, it is subjected in its totality to the emphasized drawing effect obtained according to the invention.

The hot gases forming the hot zone 11 together with the gases escaping from the inside of the centrifuging body through the openings 12 constitute an upward column which affords the advantage of producing a driving action for the fibres in the space surrounding the centrifuging body, and of gathering said fibres into a vertically rising strand 13 which may be easily received for instance on a vertical cylinder placed on the same axis as the rotating body.

When instead of being very long i. e. able to be gathered into strands, the fibres 10 are shorter, the above mentioned column of hot gases may be used for gathering the short fibres around a mandrel, thus directly constituting cylindrical elements composed of very fine fibres. The fibres may be received on a revolving cylinder with a horizontal axis placed above the centrifuging apparatus and eventually moved to-and-fro longitudinally. This is illustrated in Figure 6 in which a pipe 18 is located centrally in the hollow driving shaft 7, through which pipe glass balls fed from the holder 15 are blown upwardly into the centrifuge by the air jet 16. This figure also shows a horizontal roller 20 located above the centrifuge to receive the fibres as well as a driving pulley 19 on the shaft 7.

The obtained cylindrical elements are particularly fit for insulation purposes. Such process also enables to obtain webs having a great surface and a small thickness, which may in some cases be used instead of ordinary fabrics. For spreading the web on the surface of the cylinder on which the fibres are received, a suction may be created in the cylinder which is itself provided with borings. Any known method for sizing or coating the fibres may be used.

In a general way, in respect of the feeding of viscous material to the hollow body, it is possible, according to a particularly advantageous embodiment of the invention, to introduce such materials in the form of cold or at least stiff balls, brought upward into the hollow body through a tube inside the driving shaft 7, the balls being thrown upward into the hollow body, for instance by means of a catapult. Such method has the advantage that the top of the centrifuging body is free from any mechanical device and consequently the fibres may be easily gathered above said body.

It must be understood that my invention is not limited to the above described embodiments, but that it may be carried out by any device enabling to use the hereabove defined process.

What I claim is:

1. The hereinbefore described process of producing vitreous fibres which comprises extruding the material by centrifugal force from a centrifuge at a relatively low temperature, locally raising the extruded material to a temperature higher than that at which it was extruded while subjecting it to traction by the centrifuge and cooling the attenuated fibres thereby produced.

2. The hereinbefore described process of producing vitreous fibres which comprises extruding the material by centrifugal force from a centrifuge at a relatively low temperature, locally raising the extruded material for a limited portion of its length to a temperature higher than that at which it was extruded while subjecting it to traction by the centrifuge and cooling the attenuated fibre thereby produced.

3. The hereinbefore described process of producing vitreous fibres which comprises extruding the vitreous material by centrifugal force from a centrifuge at a relatively low temperature, locally heating the extruded material at a point remote from that of is extrusion to a temperature higher than that at which it was extruded while subjecting it to traction from the centrifuge and cooling the thus attenuated fibres.

4. The hereinbefore described process of producing vitreous fibres which comprises extruding glass from a revolving centrifuge while at a temperature of about 700° C., locally raising the extruded material to a temperature of about 900° C. while subjecting it to traction from the centrifuge and cooling the attenuated fibre thus produced.

5. A device for the production of fibres from vitreous material comprising a centrifuge for containing the said material and having peripheral openings therein, means for heating the material in the centrifuge and means surrounding the centrifuge to locally heat the issued material to a temperature greater than that which issued from the centrifuge.

6. In combination with a device for the production of fibres from a vitreous material, a centrifuge having peripheral openings therein for containing the said material, means for heating the material in the centrifuge and an annular burner surrounding the centrifuge to heat the issuing material through a limited zone remote from the centrifuge, the burners being directed normally to the plane of issue of the material.

7. In combination with a device for the production of fibres from a vitreous material, a centrifuge having peripheral openings therein for containing the said material, a hollow shaft carrying the said centrifuge and feeding combustible material thereto, a series of burners surrounding the centrifuge to heat the issuing material through a limited zone remote from its point of issuance, the burners being directed normally to the plane of issue of the material.

8. In combination with a device for the production of fibres from a vitreous material, a centrifuge having peripheral openings therein for containing the said material, a hollow shaft carrying the said centrifuge and feeding combustible material thereto, an annular burner surrounding the said centrifuge and projecting the flames upwardly and across the plane of projection of the said material from the centrifuge.

9. The hereinbefore described process of producing vitreous fibres which comprises extruding the material by centrifugal force from a centrifuge at a temperature sufficient for its extrusion but not sufficiently high to enable its attenuation into fibres, raising the extruded material to a temperature sufficient for the drawing of the material while subjecting it to traction from the centrifuge and then cooling the attenuated fibres thereby produced.

IVAN PEYCHES.

REFERENCES CITED

The following references are of record in the file of this patent:

UNITED STATES PATENTS

| Number | Name | Date |
|---|---|---|
| 2,152,423 | Von Reis | Mar. 28, 1939 |
| 2,192,944 | Thomas | Mar. 12, 1940 |

FOREIGN PATENTS

| Number | Country | Date |
|---|---|---|
| 514,243 | Great Britain | Nov. 2, 1939 |
| 571,807 | Germany | Mar. 6, 1933 |